(12) United States Patent
Schjelderup et al.

(10) Patent No.: US 10,041,334 B2
(45) Date of Patent: Aug. 7, 2018

(54) ACID BLOCK AND METHOD OF LOCAL ACID TREATMENT OF SUBSEA CONNECTING ELEMENT

(71) Applicant: Jupa AS, Randaberg (NO)

(72) Inventors: John Harald Schjelderup, Stavanger (NO); Endre Birkeland, Randaberg (NO); Hallvar Møller, Stavanger (NO)

(73) Assignee: Jupa AS, Randaberg (NO)

( * ) Notice: Subject to any disclaimer, the term of this patent is extended or adjusted under 35 U.S.C. 154(b) by 307 days.

(21) Appl. No.: 14/911,056

(22) PCT Filed: Aug. 27, 2014

(86) PCT No.: PCT/NO2014/050152
§ 371 (c)(1),
(2) Date: Feb. 9, 2016

(87) PCT Pub. No.: WO2015/041538
PCT Pub. Date: Mar. 26, 2015

(65) Prior Publication Data
US 2016/0194547 A1 Jul. 7, 2016

(30) Foreign Application Priority Data

Sep. 17, 2013 (NO) .................................. 20131248

(51) Int. Cl.
*E21B 37/06* (2006.01)
*E21B 41/00* (2006.01)
(Continued)

(52) U.S. Cl.
CPC ................ *E21B 37/06* (2013.01); *C09K 8/52* (2013.01); *C09K 8/524* (2013.01); *C09K 8/528* (2013.01);
(Continued)

(58) Field of Classification Search
CPC ................................ E21B 37/06; C09K 8/536
See application file for complete search history.

(56) References Cited

U.S. PATENT DOCUMENTS 2,080,875 A * 5/1937 Pitzer .................... C09K 8/536
166/299
3,793,221 A * 2/1974 Otrhalek .................. C11D 1/83
134/3
(Continued)

FOREIGN PATENT DOCUMENTS

| CN | 102358834 | 2/2012 |
|---|---|---|
| GB | 2174105 | 10/1986 |
| WO | 9117238 | 11/1991 |

OTHER PUBLICATIONS

Dictionary definition of "block", accessed Mar. 15, 2018 via thefreedictionary.com.*

(Continued)

*Primary Examiner* — Blake E Michener
(74) *Attorney, Agent, or Firm* — Andrus Intellectual Property Law, LLP

(57) ABSTRACT

An acid block is for local acid treatment of a subsea connecting element, which is in need of cleaning by acid treatment. A block element, which is formed from an acid or an acid residue in solid form, is formed for positioning on or at a portion of the connecting element, for example a connecting interface formed according to an API standard. A method is for acid treatment of a subsea connecting element, which is in need of cleaning by acid treatment.

11 Claims, 4 Drawing Sheets

(51) Int. Cl.
*C09K 8/524* (2006.01)
*C11D 3/37* (2006.01)
*C09K 8/52* (2006.01)
*C11D 7/26* (2006.01)
*C11D 7/32* (2006.01)
*C11D 11/00* (2006.01)
*E21B 41/04* (2006.01)
*C09K 8/528* (2006.01)
*C09K 8/536* (2006.01)

(52) U.S. Cl.
CPC ............ *C09K 8/536* (2013.01); *C11D 3/3761* (2013.01); *C11D 7/265* (2013.01); *C11D 7/3245* (2013.01); *C11D 11/0041* (2013.01); *E21B 41/0007* (2013.01); *E21B 41/04* (2013.01)

(56) References Cited

U.S. PATENT DOCUMENTS

| | | | | |
|---|---|---|---|---|
| 4,986,354 A * | 1/1991 | Cantu | .................... | C09K 8/516 166/279 |
| 5,922,652 A * | 7/1999 | Kowalski | ............... | C09K 8/536 264/4.3 |
| 6,432,906 B1 * | 8/2002 | Carlson | .................. | C11D 3/323 510/446 |
| 6,444,316 B1 * | 9/2002 | Reddy | ..................... | B01J 13/22 427/212 |
| 6,569,254 B2 | 5/2003 | Courson et al. | | |
| 2002/0128157 A1 * | 9/2002 | Bates | .................... | C09K 8/536 507/90 |
| 2003/0032562 A1 * | 2/2003 | Crossman | ................. | C08L 3/00 507/212 |
| 2004/0014607 A1 * | 1/2004 | Sinclair | ................. | C09K 8/516 507/200 |
| 2006/0124302 A1 * | 6/2006 | Gupta | .................... | C09K 8/516 166/279 |
| 2009/0301717 A1 | 12/2009 | Lunde et al. | | |
| 2012/0006554 A1 | 1/2012 | Allen et al. | | |
| 2012/0217012 A1 | 8/2012 | Darby | | |
| 2012/0285695 A1 * | 11/2012 | Lafferty | ................... | C09K 8/03 166/310 |

OTHER PUBLICATIONS

International Search Report for PCT/NO2014/050152 dated Dec. 11, 2014.
Written Opinion for PCT/NO2014/050152 dated Dec. 11, 2014.
Response to Written Opinion for PCT/NO2014/050152 filed Apr. 9, 2015.
Written Opinion for PCT/NO2014/050152 dated Aug. 20, 2015.
Response to Written Opinion for PCT/NO2014/050152 filed Oct. 15, 2015.
International Preliminary Report on Patentability for PCT/NO2014/050152 dated Dec. 3, 2015.

* cited by examiner

ACID BLOCK AND METHOD OF LOCAL ACID TREATMENT OF SUBSEA CONNECTING ELEMENT

CROSS-REFERENCE TO RELATED APPLICATIONS

This application is the U.S. national stage application of International Application PCT/NO2014/050152, filed Aug. 27, 2014, which international application was published on Mar. 26, 2015, as International Publication WO2015/041538 in the English language. The international application is incorporated herein by reference, in entirety. The international application claims priority to Norwegian Patent Application No. 20131248, filed Sep. 17, 2013, which is incorporated herein by reference, in entirety.

FIELD

An acid block and a method of local acid treatment of a subsea connecting element in need of cleaning by acid treatment are described.

BACKGROUND

Subsea installations are subjected to the build-up of scaling, especially calcium-based scaling. In certain situations, such scaling may give operational delays. It may lead to overstraining of, for example, valve stems and a frequent need for mechanical cleaning of seal surfaces. The problems created by scaling are sought to be solved by affected components being treated with an acid solution, the acid reacting with the scaling and dissolving it. Often, a weak citric acid is used which is formed from powder or granulate and water, which is then filled into containers that are transported to the treatment site where a diver or an ROV (Remotely Operated Vehicle) carries out the treatment of the installation. The treatment takes place by the acid solution being sprayed slowly at the detail, which is to be treated, trying to keep the loss of acid solution into the surroundings as small as possible. Loss is still inevitable, and this often results in more acid solution having to be picked up at the surface, which is time-consuming and costly.

SUMMARY

The invention has for its object to remedy or reduce at least one of the drawbacks of the prior art or at least provide a useful alternative to the prior art.

The object is achieved through features, which are specified in the description below and in the claims that follow.

The invention provides a device and a method of cleaning submerged mechanical connecting elements by the use of acid, for example citric acid, in solid form, more particularly in block form, the shape being adapted to the connecting element to be cleaned and possibly also to the immediate vicinity, for example a screen encircling a handle or forming part of the handle. The interface between the connecting element and the acid block is defined in, for example, API standards for valve and coupling interfaces.

The acid block is preferably provided with a handle, which can be gripped by a diver or an ROV. The handle is preferably formed from a biologically degradable material.

When the acid block has been brought up to the connecting element that is to be cleaned, it is positioned on or in the connecting element or in the immediate vicinity of the connecting element and left there. The acid is gradually dissolved by the water penetrating into clearances between the acid block and the connecting element or its surroundings. The treatment continues until the entire acid block has been dissolved and without the diver or ROV having to be present. Because of the adapted interface between the connecting element and the acid block, the acid treatment takes place with little loss of acid into the surrounding water masses. The efficiency of the treatment thereby increases. If it is necessary to remove residues from the acid treatment, they may be flushed away. The handle may be left behind in the environment, where it, when formed from a biologically degradable material, degrades without leaving any solid residual substances.

In a first aspect, the invention relates more specifically to an acid block for the local acid treatment of a subsea connecting element, which is in need of cleaning by acid treatment for the removal of scale fouling, characterized by a block element, which is formed from an acid or a solid acid residue in solid pressed or moulded form, being formed for positioning on or at an interface providing a coupling portion of the connecting element, the shape of the block element being adapted to the coupling portion of the connecting element, wherein at least a portion of the block element is substantially complementary to a portion of the connecting element, and wherein the block element is provided with a handle arranged to be gripped by a diver or a manipulator.

The acid may be taken from a group comprising tricarboxylic acids, polymaleic acids and aminopolycarboxylic acids.

The acid may be citric acid.

The block element may include a binder, preferably a water-soluble binder.

The subsea connecting element may be a valve or a coupling.

The handle may be formed from a biologically degradable material.

At least one or more portions of the block element may exhibit a clearance to the surrounding or surrounded connecting element in order to provide a flow path for a surrounding water mass. The clearance is preferably in the range of 1-15 mm.

Alternatively, a flow path may have been formed as cut-outs extending through the acid block.

In a second aspect, the invention more specifically relates to a method of acid treatment of a subsea connecting element, which is in need of being cleaned by acid treatment, characterized by the method including the following steps:
  forming an acid block, said acid block comprising a handle arranged to be gripped by a diver or a manipulator and arranged in a block element made from an acid or an acid residue in pressed or moulded solid form, the block element being formed for positioning on or at an interface providing a coupling portion of the connecting element, the shape of the block element being adapted to the coupling portion of the connecting element, wherein at least a portion of the block element is substantially complementary to a portion of the connecting element;
  bringing the acid block into engagement with the connecting element; and
  allowing the block element to be dissolved by a surrounding water mass.

The method may include the further step of:
  taking the acid from a group comprising tricarboxylic acids, polymaleic acids and aminopolycarboxylic acids.

The method may include the further step of:
forming the block element from citric acid.
The method may include the further step of:
forming the block element from an acid in a mixture with a binder.
The method may include the further step of:
providing the handle from a biologically degradable material.

BRIEF DESCRIPTION OF THE DRAWINGS

In what follows, an example of a preferred embodiment is described, which is visualized in the accompanying drawings, in which.

DETAILED DESCRIPTION OF THE DRAWINGS

Figure 1:
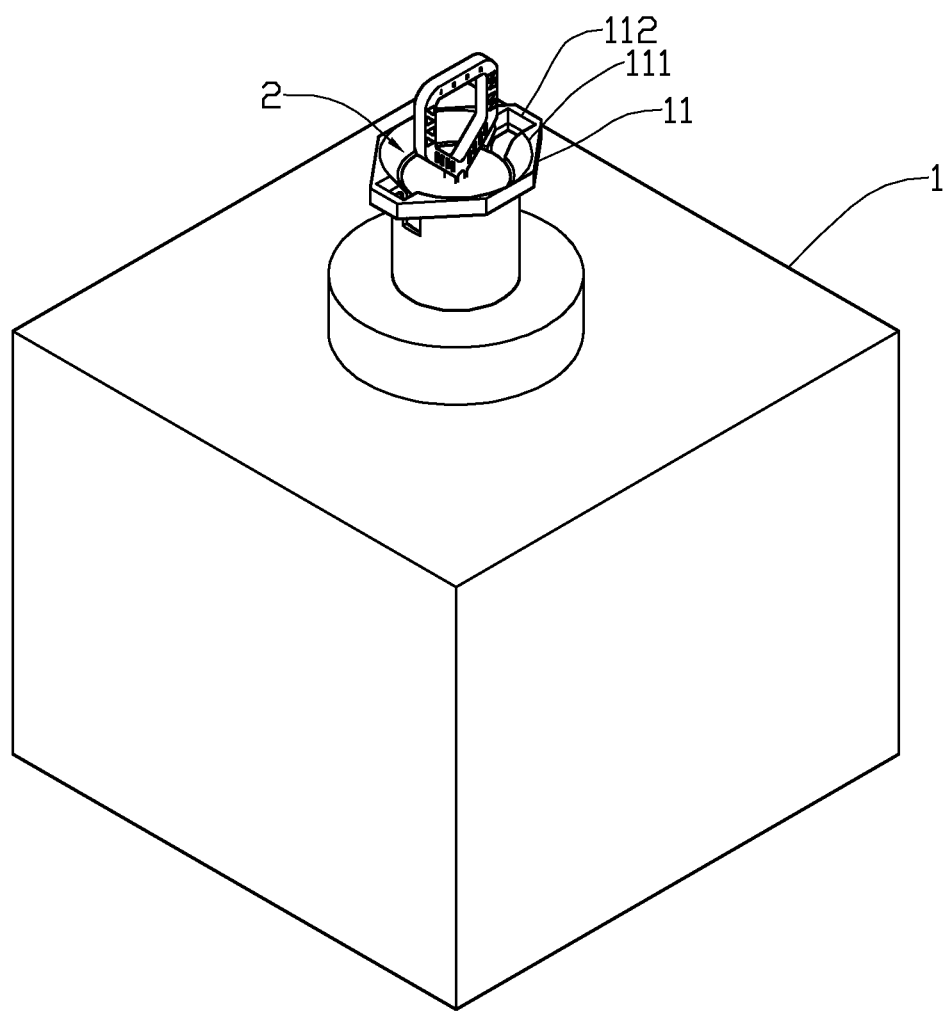
FIG. 1 shows a perspective drawing of an acid block according to the invention arranged in a portion of a connecting element which is to be acid-treated, formed according to an API standard.
Figure 2:
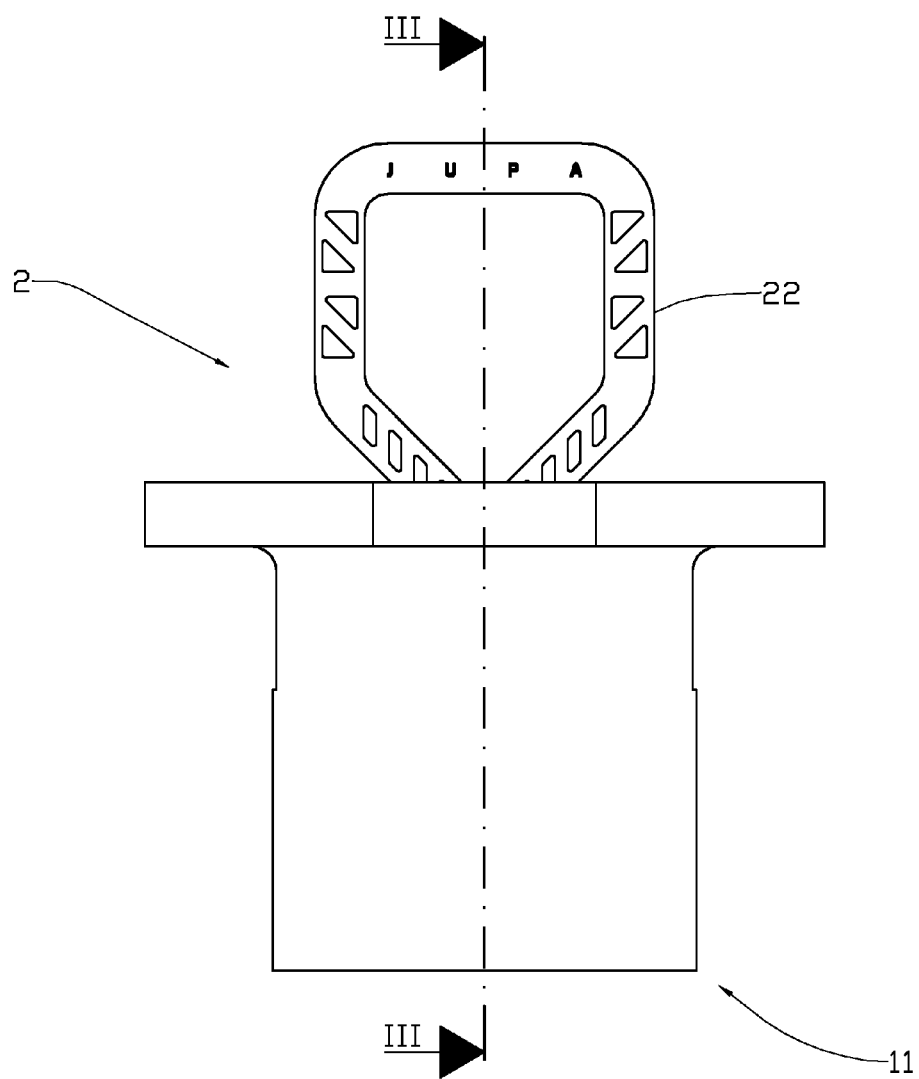
FIG. 2 shows a side view on a larger scale of the connecting element to be acid-treated, with a handle projecting up from the acid block.
Figure 3:
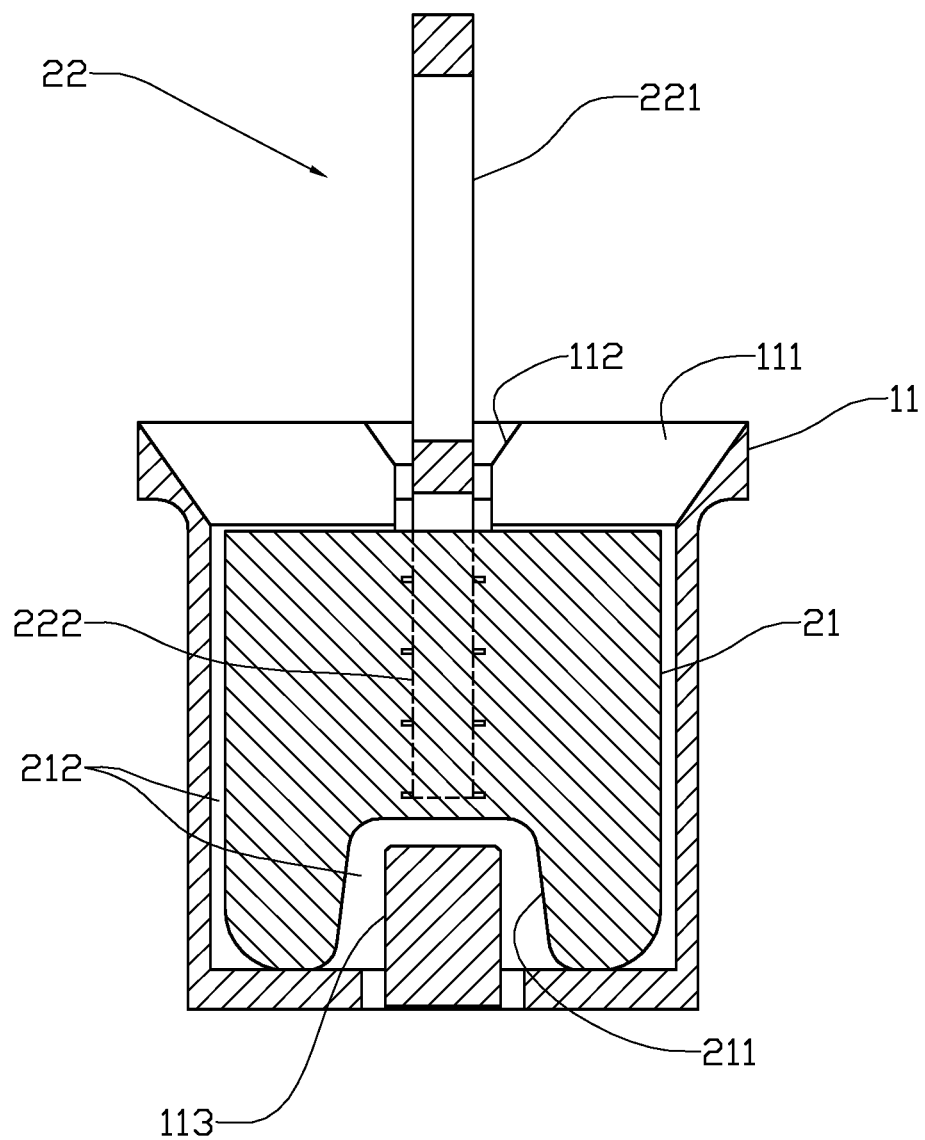
FIG. 3 shows a cross section III-III from FIG. 2 through the center axis of the connecting element and the acid block.
Figure 4:
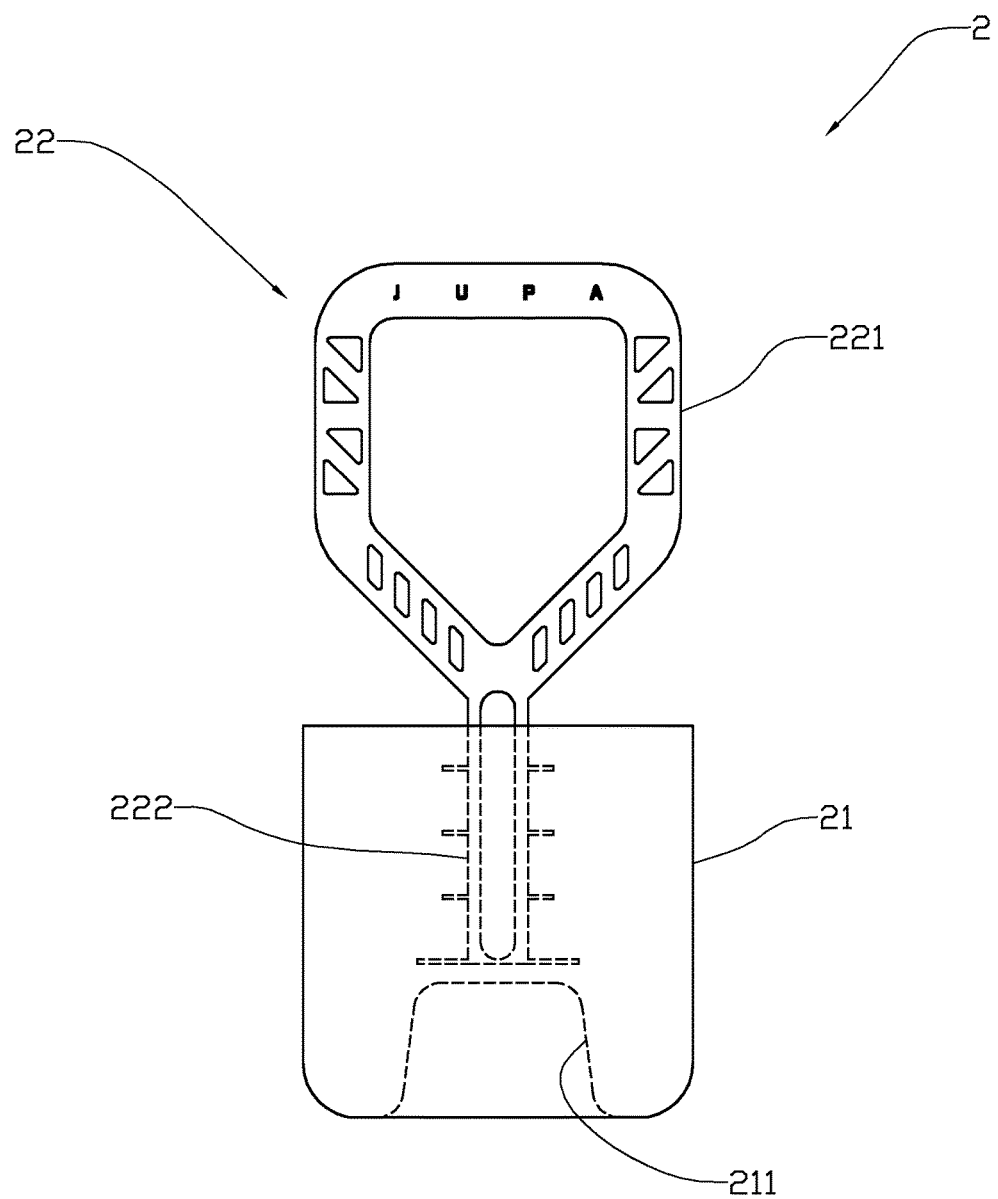
FIG. 4 shows a side view through the acid block.

In the figures, the reference numeral 1 indicates a connecting element, which is subject to acid treatment for the removal of scale fouling. An element portion 11 forms an interface for a coupling portion or handle, which is handled by a diver (not shown) or a remote-controlled manipulator (not shown), typically formed according to an industry standard, for example a so-called "receptacle" according to API 17H CL4. In the embodiment shown, the element portion 11 includes a conical mouth portion 111 facilitating the insertion of the coupling portion or handle formed by the element portion 11. Cut-outs 112 form engagement portions for the coupling portion or handle. The interface also forms an interface for an acid block 2, which is arranged to be left behind there by a diver (not shown) or a remote-controlled manipulator (not shown).

The acid block 2 includes a block element 21 formed from an acid, an acid residue or an acidic salt in solid form, pressed or moulded, possibly mixed with a binder and/or a filler. In the embodiment shown, the block element 21 includes a block recess 211, which is arranged to accommodate an upward-projecting portion 113 of the element portion 11. Portions of the block element 21 exhibit a clearance between the element portion 11 and the block element 21 to enable the entrance of water from the surroundings. Typically, the clearance between the periphery of the block element 21 and the surrounding element portion 11 is in the order of 5 mm, and for other portions, the clearance may be about double to give sufficient room for acid-block-dissolving water. If large amounts of scaling are to be removed, the clearances to the element portion 11 will have to be increased for the acid block 2 to be inserted into the element portion 11 without being obstructed by the scaling.

The acid block 2 includes a handle 22, in which a handle loop 221 is arranged to be gripped by a diver (not shown) or a remote-controlled manipulator (not shown). From the handle loop 221, a handle neck 222 extends anchoringly into the block element 21. The handle 22 is preferably formed from a biologically degradable material.

The acid is taken from a group comprising tricarboxylic acids, polymaleic acids and aminopolycarboxylic acids. In a preferred embodiment, citric acid is used. In one embodiment, the block element 21 may include a water-soluble binder.

When a connecting element 1 that forms the interface 11 for the coupling portion or handle 22, which is handled by a diver (not shown) or a remote-controlled manipulator (not shown), is to be acid-treated, an acid block 2 is carried from a surface installation (not shown) to the subsea connecting element 1 and connected to the connecting element 1 via the interface 11, possibly after this has been cleaned of loose particles and so on, for example by flushing with water.

When the acid block 2 has been positioned, the acid treatment starts immediately, as the acid block 2 is dissolved gradually by the surrounding water mass that enters the flow path 212 formed by the clearances between the acid block 2 and the connecting element 1. Movements in the water mass will carry some of the acid solution away from the connecting element 1, but a substantial part of the acid solution will stay near the connecting element 1 and act on the scaling in the connecting element 1.

When the block element 21 is nearly dissolved, the handle 22 will be released and may float away from the connecting element 1. Gradually, the handle 22, too, will be dissolved by the surrounding water mass without leaving any solid residues.

The invention claimed is:

1. An acid block for local acid treatment of a subsea connecting element, which is in need of cleaning by acid treatment for the removal of scale fouling, the acid block comprising:
a block element, which is formed from an acid or an acid residue in solid pressed or moulded form, is adapted for positioning on or at an interface formed by an element portion of the subsea connecting element, the shape of the block element being adapted to be received by the element portion of the subsea connecting element, wherein at least a portion of the block element is adapted to be accommodated by a portion of the subsea connecting element, and
wherein the block element is provided with a handle adapted to be gripped by a diver or a remote-controlled manipulator.

2. The acid block according to claim 1, wherein the acid is selected from a group consisting of tricarboxylic acids, polymaleic acids and aminopolycarboxylic acids.

3. The acid block according to claim 1, wherein the acid is citric acid ($C_6H_8O_7$).

4. The acid block according to claim 1, wherein the block element includes a binder.

5. The acid block according to claim 4, wherein the binder is water-soluble.

6. The acid block according to claim 1, wherein the handle is formed from a degradable material.

7. A method of acid treatment of a subsea connecting element, which is in need of cleaning by acid treatment, the method comprising:
forming an acid block, the acid block comprising a handle adapted to be gripped by a diver or a remote-controlled manipulator and arranged in a block element made from an acid or an acid residue in pressed or moulded solid form, the block element being configured for positioning on or at an interface providing an element portion of the subsea connecting element, the shape of the block element being configured to be received by the element portion of the subsea connecting element, wherein at least a portion of the block element is configured to be accommodated by a portion of the subsea connecting element;

bringing the acid block into engagement with the subsea connecting element; and allowing the block element to be dissolved by a surrounding water mass.

8. The method according to claim 7, further comprising:

selecting the acid from a group consisting of tricarboxylic acids, polymaleic acids and aminopolycarboxylic acids.

9. The method according to claim 7, further comprising:

forming the block element from citric acid ($C_6H_8O_7$).

10. The method according to claim 7, further comprising:

forming the block element from an acid in a mixture with a binder.

11. The method according to claim 7, further comprising:

forming the handle from a degradable material.

\* \* \* \* \*